United States Patent [19]

Mongrolle

[11] 4,361,175
[45] Nov. 30, 1982

[54] FLUID FEEDING DEVICE FOR ROTATING PLATFORMS

[75] Inventor: Yves L. Mongrolle, Paris, France

[73] Assignee: Societe Anonyme de Telecommunications, Paris, France

[21] Appl. No.: 171,296

[22] Filed: Jul. 23, 1980

[30] Foreign Application Priority Data

Jul. 25, 1979 [FR] France ............... 79 19164

[51] Int. Cl.³ .................. B65B 3/04; F16L 27/08
[52] U.S. Cl. ............................. 141/283; 141/311 R; 285/190
[58] Field of Search ............... 141/250–284, 141/37, 59, 197, 311 R, DIG. 1; 285/98, 108, 190

[56] References Cited

U.S. PATENT DOCUMENTS 3,513,871  5/1970  Johnston ............ 285/190 X
3,626,998  12/1971 Trusselle ............ 141/284

Primary Examiner—Frederick R. Schmidt
Attorney, Agent, or Firm—Fleit & Jacobson

[57] ABSTRACT

A device intended to feed a gaseous high-pressure fluid to a platform supported on a frame on which is located a pressure source, said device comprising a rotating joint unit including two fluid conduct members mounted in relative rotational relationship to said platform along the geometrical axis around which said platform is rotating, one of said members being connected to fittings usable for feeding said fluid and located on said platform. The other member is intended to feed said pressure source, the fluid conduct member which is intended, in the joint unit, to be connected to said pressure source is connected to the latter by a releasable connecting member. The coupling of said member depends on the fluid feeding required by the user or by said fitting usable for the fluid feeding and mounted on said platform.

8 Claims, 2 Drawing Figures

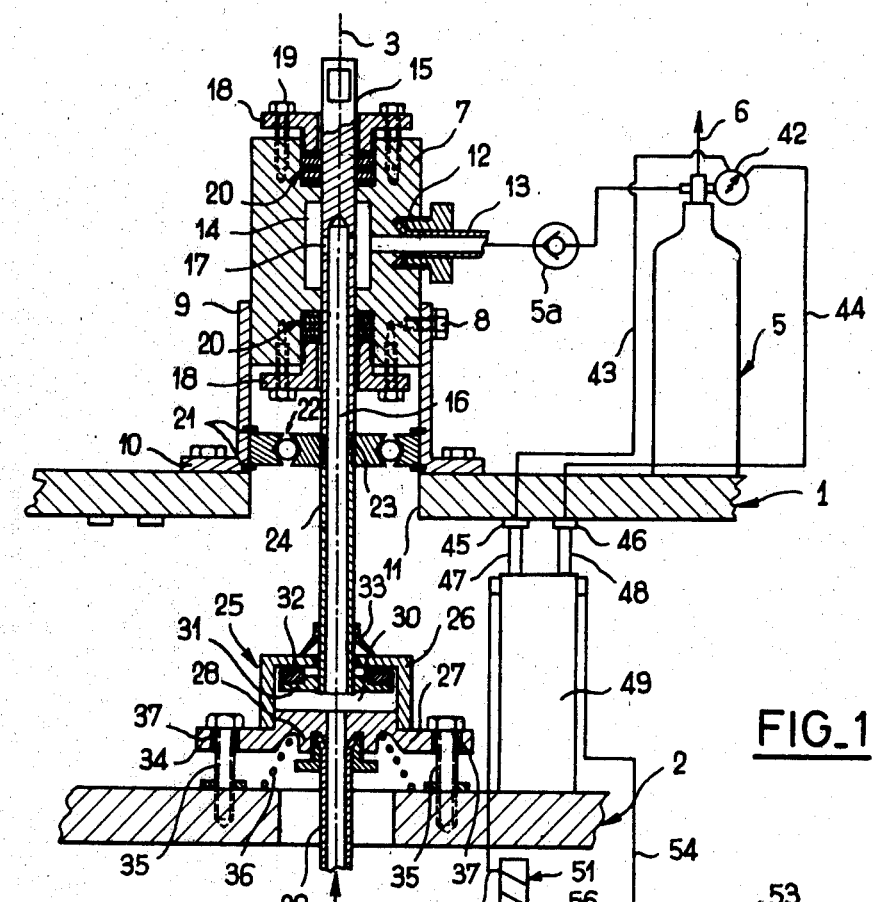
FIG_1
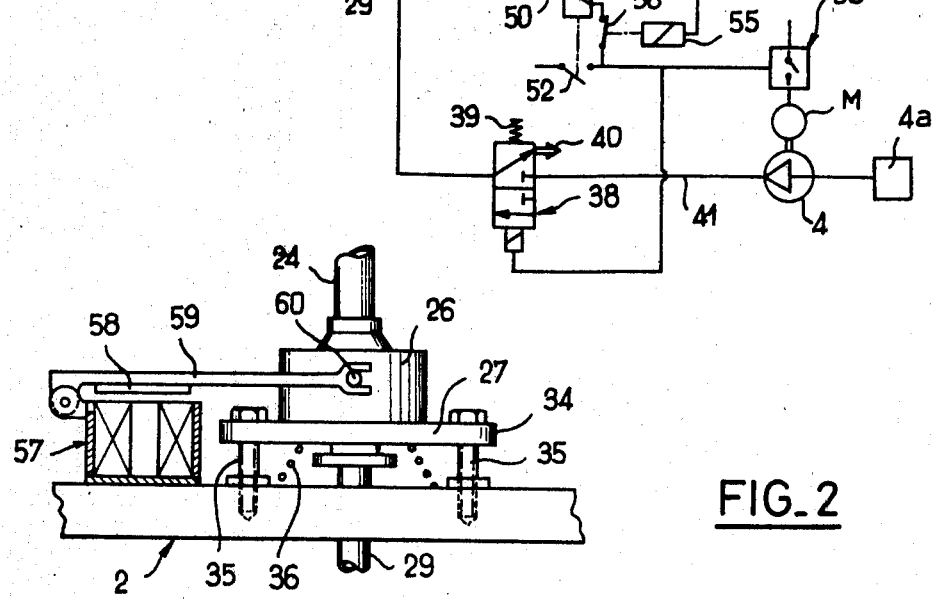
FIG_2

FLUID FEEDING DEVICE FOR ROTATING PLATFORMS

The invention relates to a feeding device for providing to a rotating platform a gaseous high-pressure fluid. The expression "high-pressure" used herein means a pressure range from about 100 bars to about 500 bars and more, which is the case for platforms and turrets intended to detect infra-red radiations and provided with a cooling system of the Joule-Thomson expansion type, said system being fed with a gaseous fluid under high pressure.

The relative feeding of a rotating platform supported by a frame on which is mounted the pressure source requires a rotating joint unit. When the system is operated under the aforesaid pressures, said rotating joint unit is subjected to hard operating conditions and, as a result, must be replaced fairly often, which necessitates detrimental stops of the usual operation fittings mounted on said platform.

The present invention has for an object to largely obviate to the above-mentioned disadvantages and, to accomplish this purpose, provides a relatively simple assembly which substantially increases the life period of time of the rotating joint unit.

Another object of the invention is to provide a device intended to feed a gaseous high-pressure fluid to a platform supported on a frame on which is located a pressure source, said device comprising a rotating joint unit including two fluid conduct members mounted in relative rotational relationship to said platform along the geometrical axis around which said platform is rotating, one of said members being connected to fittings usable for feeding said fluid and located on said platform, whereas the other member is intended to feed said pressure source, wherein the fluid conduct member which is intended, in the joint unit, to be connected to said pressure source is connected to the latter by a releasable connecting member, the coupling of said member depending on the fluid feeding required by the user or by said fitting usable for the fluid feeding and mounted on said platform.

Thus, when the gaseous fluid feeding of the platform is only required for a certain time period of the rotation thereof, the two aforesaid members of the rotating joint unit are rotating together without stress and, as a result, the life period of time of said joint unit is fairly increased.

According to another especially interesting embodiment of the invention, especially when the platform is continuously rotating, use being either frequently or permanently made of the pressure fluid, provision is advantageously made, in the operational fittings, of a storage means for the pressure fluid, said storage means which is mounted on the platform, being intended to be filled and refilled via non-return means for controlling the flow setting of said pressure source and by coupling said connecting unit within a predetermined pressure range in said storage means.

According to a further embodiment of the invention, it is also possible to only use the pressure fluid delivered by the source during the controlled feeding as to cause the coupling of the releasable connecting unit which is normally uncoupled.

Other features of the invention will also appear from the following description of a form of embodiment given by way of example and with reference to the accompanying drawing in which:

FIG. 1 is an axial cross-section of a rotating joint fitted between a rotating platform and a frame, with a partial diagram of an apparatus using a fluid under high pressure and a feeding control device for the latter;

FIG. 2 is a detail view of an alternative form of embodiment relating to said releasable joint unit with controlled coupling.

In FIG. 1 is shown a device intended to feed a gaseous high-pressure fluid to a rotating platform 1 which is partially shown and supported on a frame 2. Said platform is guided in rotating relationship in respect to said frame 2 about a geometrical axis 3 through a crown-shaped guiding path not shown in the drawings, the center of said path coinciding with axis 3.

The pressure source is diagrammatically shown at 4 as a compressor mounted in fact on the frame, whereas the operational fittings which are mounted on platform 1 comprise a storage tank 5 for the high-pressure fluid, said tank being connected to the proper fittings by means of a duct 6 and fed through a non-return valve 5a.

A rotating joint intended to conduct the fluid is fitted on platform 1 and comprises a body 7 removably mounted into a support sleeve 9 by means of a screw 8, said sleeve 9 being provided with a flange 10 secured by screws to platform 1 as to be centered about an opening 11 provided in the latter, the axis of said opening 11 coinciding with axis 3.

In body 7 is mounted a pipe 12 for connecting said body to a feeding conduct 13 connected to the storage tank 5, said conduct 13 opening within a central chamber 14 in body 7, whereas said chamber 14 is axially crossed by a shaft 15 so shaped as to form a conduct for feeding the gaseous pressure fluid into the rotary joint unit. Shaft 15 comprises an axial duct 16 which is open at the lower end thereof, and radial through-holes opening within chamber 14. The tightness of shaft 15 in body 7 is insured by means of suitable stuffing-boxes shown on the drawings as having flanges 18 provided with screws 19 for clamping sealing rings 20 surrounding shaft 15 on each side of chamber 14, said rings 20 being either soft or hard and disposed in staggered relationship with each other.

Within support sleeve 9 is also locked by means of circular fasteners 21 the external ring of a ball thrust-bearing, in the internal ring of which is secured the lower threaded end of shaft 15.

Opposite said shaft end, provision being made of a flat compression sealing joint 23 therebetween, is screwed the upper threaded end of an outlet conduct 24 of a disengageable connecting unit referenced as a whole by 25. This connecting unit 25 comprises a body screwed on a base plate 27 provided with a connecting portion for a feeding pipe 29 which opens into a chamber 30 limited by body 26 and base plate 27, the outlet duct 24 of the connecting unit entering with a certain clearance into said chamber 30. This outlet conduct 24 is provided, at the end thereof which is located within chamber 30, with a circular plate 31 with regard to which body 26 may be axially moved in the direction of either opening or closure of chamber 30, as that would be stated hereinafter. Plate 31 is provided, opposite body 26, with an elastomeric ring 32 intended to insure the tightness of chamber 30, during the closure of the latter, as well as a coupling of plate 31 with body 26 under the action of the fluid pressure within said chamber.

On conduct 24 is mounted a lip sealing joint 33 which bears on body 26 in resilient flexion relationship with the latter as to form a release valve for opening chamber 30 to the environment as well as a non-return valve in order to hinder the air environment to penetrate into said chamber. The base plate 27 of the connecting unit is provided with a flange 34 which is slidably mounted on guide-rods 35 which are parallel to axis 3 and screwed on frame 2. Said base plate 27 is biased by means of a spring 36 as to be in abutment against the heads of guide-rods 35. In said position, body 26 is normally spaced from plate 31, which corresponds to the opening position of chamber 30 as shown on the drawings. Flang 34, in order to be slidably mounted on guide-rods 35, is provided with bores 37 having a diameter larger than that of said guide-rods, and, as a result, any accurate centering problem between outlet duct 24, which is connected to the shaft 15 of the rotating joint unit, and the assembly consisting of the body 26 and of the plate-base 27 of the connecting device, is avoided.

Conduct 29 is intended to be connected to a gaseous pressure fluid source which may consist, as shown in the drawings, of a compressor 4 mounted on the frame and drawing said fluid from an identical gaseous fluid source at lower pressure as diagrammatically shown at 4a. The compressor 4 may be of a type wherein the exhaust outlet is open to environment when said compressor is not operated. Should this arrangement not be provided, a two-position/three-way electrovalve 38 might be mounted between connecting device 25 and compressor 4 as to, by means of spring 39, normally open conduct 29 in exhaust relationship to environment through non-return exhaust resilient valve 40, whereas conduct 41 connecting the electrovalve to the compressor should be closed.

It has to be noted that when the feeding device is in a position as shown in the drawings, the storage tank 5 for the pressure fluid being supposed to be loaded at the desired pressure, the platform may rotate in a continuous way and the fittings thereof may be fed through tank 5, whereas, the connecting device 25 being released, body 7 and shaft 15 in the rotating joint unit, as well as the outlet conduct 24 in the connecting unit 25, rotate as a whole. In said arrangement, the sole slight existing friction is that involved by lip sealing joint 33 on body 26, in order to only avoid any air to penetrate within connecting unit 25 and feeding conduct 29. The rotating joint as a whole is substantially at a pressure which is slightly lower than that of the environment, whereas the exhaust pressure depends on both sealing joint 33 and valve 40. Accordingly it appears that any unnecessary wear or stress to said rotating joint unit is avoided in operation by means of said assembly.

The compressor is only operated for the period of time required for refilling the storage tank mounted on the platform.

The compressor may be controlled in operation by a usual pressure adjusting device intended to maintain the operational pressure therein between two predetermined values as to define a range in which the compressor 4 is operated and the possible electrovalve 38 is energized, in order to cause connecting unit 25 to be fed, and as a result tank 5 is fed as follows:

When the fluid under high pressure is admitted within chamber 30 of the connecting unit, the resulting dynamic effect causes the body 26 to be quickly thrust onto plate 31, the plate base 27 of said body 26 being lowered against the force of spring 36, which has to be determined in order to insure by the mere action thereof the previous opening of chamber 30. Thus connecting unit 25 after a slight fluid leak to environment via lip sealing joint 33 is provided with tight conditions at the level of ring 32 and coupled between body 26 and outlet duct 24, i.e. shaft 15 of rotating joint unit is then affixed in rotation with sealing ring joints 20 under load, but this condition is only kept during the period of time which is required for the load of storage tank 5 and for which the platform is rotating.

In fact when the maximal desired pressure is attained in said storage tank, compressor 4 is stopped, whereupon connecting unit 25 is open to environment either by the compressor itself or by means of the possible electrovalve 38, and accordingly, when the pressure within the connecting unit and the rotating joint unit is lowered close to the atmospheric pressure, the body 26/plate-base 27 assembly of the connecting unit is biased upwards by means of spring 36, and as a result the platform is disengaged therefrom and again the rotating joint unit is kept out of pressure, whereas the shaft 15 is able to rotate together with joint body 7 without unnecessary wear or stress.

It should be noted that in said arrangement, the stuffing-boxes of the rotating joint unit may be possibly replaced without having to stop the platform and the fittings thereof, taking on account the energy gradient of the fluid stored in tank 5, the relative replacements being suitably made by dismounting body 7 from support sleeve 9. Although said body is secured on said sleeve by means of screws, as shown in the drawings, provision may also be made of another securing means, such as any quick-set clamping means. Besides the relative securing of duct 13 may be realized by any usual quick-set connecting device.

If desired shaft 15 may also be dismounted by unscrewing with respect to stop member 22 after having closed duct 24 of connecting unit 25 by key locking.

By way of example, it has been diagrammatically shown on FIG. 1 a feeding control device for a storage tank 5, said device including a manometer 42 provided with electric contacts for controlling either minimal or maximal pressure. Said electric contacts are respectively connected by two conductors 43, 44 to two contacting paths 45, 46 provided under the platform, friction contacts 47, 48 which are mounted in a casing 49 secured to the frame, being adapted to cooperate with said paths. Contact 47 is connected through conductor 50 to an energizing winding of a relay 51 provided with a self-maintaining winding fed by its contact 52 which is also able to feed the winding of the electrovalve 38 as well as the feeding relay 53 of an electric motor M intended to actuate compressor 4, and that from the minimal pressure threshold as detected by manometer 42. Contact 48 is connected by a conductor 54 to a relay 55 the opening contact 56 of which is located on the self-maintaining circuit for relay 51. Accordingly, when the maximal pressure threshold forecast for feeding tank 5 is detected by manometer 42, relay 51 is de-energized and as a result the driving of compressor 4 is stopped, whereas electrovalve 38 returns to its rest position, as shown in the drawings.

According to the pressure/flow characteristic of compressor 4, it could be contemplated to insure the coupling of connecting unit 25 not only by means of the fluid under pressure fed by the compressor to this end, but also by initiating said coupling by means of an auxiliary electro-magnetic control device actuated when the compressor starts, for example by closing contact 52 in relay 51.

Said arrangement is shown in FIG. 2, wherein provision is made of an electro-magnet 57 attached to frame 2, the movable armature 58 of said electro-magnet being integral with a rod 59 connected by one end thereof to the electro-magnet casing, the other end thereof being fork-shaped and provided with notched indentations intended to be engaged on two lateral spigots 60 attached to body 26 in connecting unit 25.

The energizing of electro-magnet 57 thus enables the coupling of connecting unit 25 to be initiated without any leakage of the fluid under pressure fed by the compressor, the proper pressure of the fluid thus fed of course inducing said coupling and insuring the maintaining force during the feeding of the fluid under pressure to tank 5.

Other alternative forms may be of course contemplated beyond the aforesaid embodiments only given by way of examples, without departing from the scope of the invention.

What is claimed as new is:

1. A gaseous high-pressure fluid feeding device for feeding fluid to a rotating platform having a geometrical axis of rotation and including utilization fittings for using the fluid fed to said platform, said device comprising a high-pressure fluid source separate from the platform for feeding high-pressure fluid to the utilization fittings during a high-pressure fluid feeding operation; a rotating joint unit mounted on the platform and including fluid conduct means for fluidly interconnecting said utilization fittings and said high-pressure fluid source, a first portion of said fluid conduct means being connected to said utilization fittings and a second portion extending along said geometrical axis of rotation being connectable to said high-pressure fluid source; and connecting unit means between said second portion of said fluid conduct means and said high-pressure fluid source for establishing fluid communication therebetween, said connecting unit means having a portion thereof in communication with said fluid conduct means, another portion thereof in communication with said high-pressure fluid source, and components thereof movable from a spaced apart position to an engaged position for selectively establishing fluid communication between said high-pressure fluid source and said fluid conduct means so that fluid flows from said high pressure source to said utilization fittings, the establishment of fluid communication occurring during the high-pressure fluid feeding operation.

2. A gaseous high-pressure fluid feeding device according to claim 1, wherein said utilization fittings include storage means for high pressure fluid, non-return means between said first portion of said fluid conduct means and said storage means, and wherein means are provided for controlling said high pressure fluid feeding operation within a predetermined pressure range in said storage means.

3. A gaseous high-pressure fluid feeding device according to claim 1 or 2, wherein said components of said connecting unit means are respectively forming a body and a closure member disposed within the body so as to delimit an input chamber for said high-pressure fluid, said chamber being normally open to the atmosphere in said spaced apart position, and at least one of said closure member and said body being biased to a position closing the chamber by said high-pressure fluid when delivered by said fluid source.

4. A gaseous high-pressure fluid feeding device according to claim 3, further comprising a sealing joint on said body for preventing air from penetrating into the interior thereof.

5. A gaseous high-pressure fluid feeding device according to claim 1 or 2, further comprising feeding operation control means for initiating the fluid feeding operation, and auxiliary control means responsive to said feeding operation control means for initiating the movement of said components of said connecting unit means to said engaged position.

6. A gaseous high-pressure fluid feeding device according to claim 5, wherein components of said connecting unit means are respectively forming a body and a closure member disposed within the body so as to delimit an input chamber for said high pressure fluid, said chamber being normally open to the atmosphere in said spaced apart position, said auxiliary control means including means for causing relative movement between said body and said closure member to thereby close said input chamber.

7. A gaseous high-pressure fluid feeding device according to claim 1 or 2, further comprising means for setting to an exhaust position said connecting unit means in the absence of feeding operation, said means for setting having an exhaust joint for preventing air from penetrating therein and being provided in the connection between said connecting unit means and said high-pressure fluid source.

8. A high-pressure fluid feeding device for controlling the feeding of a fluid from a high-pressure source separate from a platform to means for utilizing fluid carried by the platform, the platform being rotatable about an axis of rotation, said device comprising:

a rotating joint unit including fluid conduct means carried by the platform for establishing fluid communication between the high-pressure source and the means for utilizing fluid, said fluid conduct means rotating with the platform and having a duct receiving fluid from the high-pressure source; and connecting means for controlling fluid communication between said duct and the high-pressure source, said connecting means including a chamber in fluid communication with the high-pressure source and receiving an inlet end of said duct, said chamber being movable between a first closed position when fluid is fed from the high-pressure source through the chamber into said duct and a second position, the chamber being in the second position when fluid is not being fed from the high-pressure source into the duct, and said connecting means including biasing means for urging said chamber into the second position, said chamber being urged into the first closed position thereof by fluid being fed from the high-pressure source to the means for utilizing fluid.

* * * * *